United States Patent [19]

Walter

[11] 4,135,810
[45] Jan. 23, 1979

[54] METHOD AND SYSTEM FOR AUTOMATICALLY MATCHING THE FORMAT OF THE PROJECTED IMAGE OF AN ORIGINAL TO THE FORMAT OF THE COPYING MATERIAL

[75] Inventor: Karl Walter, Penzberg, Fed. Rep. of Germany

[73] Assignee: AGFA-Gevaert AG, Leverkusen, Fed. Rep. of Germany

[21] Appl. No.: 828,970

[22] Filed: Aug. 29, 1977

[30] Foreign Application Priority Data

Aug. 27, 1976 [DE] Fed. Rep. of Germany ....... 2638696

[51] Int. Cl.$^2$ ...................... G03B 29/00; G03B 27/52; G03B 27/34; G03B 27/58
[52] U.S. Cl. ......................................... 355/29; 355/41; 355/77; 355/74; 355/75; 355/56
[58] Field of Search ........................ 355/29, 40, 41, 50, 355/51, 55, 57, 18, 60, 72, 74, 75, 77, 64, 65, 56; 250/561

[56] References Cited

U.S. PATENT DOCUMENTS

| 3,689,143 | 9/1972 | Case et al. ........................ 355/57 X |
| 3,737,227 | 6/1973 | Harter et al. ........................ 355/74 |
| 3,792,926 | 2/1974 | Knechtel et al. ...................... 355/29 |

FOREIGN PATENT DOCUMENTS

2364681 7/1974 Fed. Rep. of Germany ............ 355/72

Primary Examiner—L. T. Hix
Assistant Examiner—W. J. Brady
Attorney, Agent, or Firm—Michael J. Striker

[57] ABSTRACT

A web of copying material is transported on-edge through an exposure-station web guidance system provided with a masking system which includes stationary and shiftable transverse-edge framing plates. The projected image of a first longitudinal-edge reference line on the copy table supporting the original is brought into register with a corresponding reference line of the masking system. The projection scale is adjusted to cause the format-breadth of the projected image to be at most slightly smaller than the format breadth of the web, but in no event greater. The projected image of the first transverse edge of the original is brought into register with the edge of the stationary framing plate, and then that of the second transverse edge with that of the shiftable framing plate. This registration is effected by sensing infrared-light images of the dark-light transitions associated with the transverse edges of the original. An exposure is performed. Before transporting the exposed section of web out of the exposure station, a cutting mark is provided by a perforator on the shiftable framing plate, and this cutting mark is thereafter detected by a detector on the stationary framing plate and triggers a severing operation.

10 Claims, 12 Drawing Figures

METHOD AND SYSTEM FOR AUTOMATICALLY MATCHING THE FORMAT OF THE PROJECTED IMAGE OF AN ORIGINAL TO THE FORMAT OF THE COPYING MATERIAL

BACKGROUND OF THE INVENTION

The invention relates to a method and system for automatically matching the format-length and format-breadth of an original and of a section of copying material to be exposed, i.e., despite differences in the format-length and format-breadth as between the original and the web of copying material transported through the exposure station.

When making photocopies, especially image-to-image copies, the original to be copied is conventionally laid upon a copy table and its image projected onto copying material through a masking system. Because the format (length and breadth) of the originals to be copied may vary, it is in general necessary to employ webs of copying material whose format-breadths correspond to those of the originals to be copied. When using copying-material webs of different format-breadths, it is usually necessary to so transport the copying-material web that its longitudinal centerline is intersected by the optical axis of the projection system of the copying machine. For this reason, it is likewise necessary to employ a masking system constituted by means defining four individually adjustable framing lines, for example four individually adjustable framing plates, for the four edges of the originals of varying format.

When it is desired to copy originals which have been cut smaller than one of the regular format sizes, it is usual to adjust the four framing lines (e.g., framing plates) of the masking system, by hand. Thus, considerable time is spent for the set-up of the copying machine for the copying of just a single original. On the average, copying machines wherein the matching of format-breadths and format-lengths is performed in this way can produce single copies at a rate on the order of magnitude of 200 copies per hour. However, in other respects, the unit productivity of such copying machines is theoretically capable of reaching values approximately five times as great. However, the problems of adjusting the masking system for the individual copies have hitherto stood in the way of fully utilizing the productivity otherwise inherent in such machines.

SUMMARY OF THE INVENTION

It is the general object of the invention to provide a method and system for automatically matching the format-lengths and format-breadths of an original to be copied and the section of copying-material onto which the image of the original is to be protected.

In particular, if the format-length of the original deviates from one of the standard format-lengths most frequently handled, trimming of the original or any other such compensating expedient is to be avoided. Instead, the format-length of the section of web to be exposed should be automatically brought into correspondence with that of the original.

It is in particular an object of the invention that the registration of the four edges of the original with the four edges of the masking system for the section of web to be exposed be performed always automatically, irrespective of variation in the format of the originals and irrespective of the extent to which the format-breadths of the originals may differ from that of the copying-material web. According to the inventive method and system this may, depending upon the situation, involve automatic adjustment of the projection scale of the projection system of the machine, i.e., in addition to adjustments in the size of the frame defined by the masking system.

It is another object of the invention to make it unnecessary to transport webs copying material in such a manner that their longitudinal centerlines are to be intersected by the optical axis of the projection system. On the contrary, it is desired to establish an invariably positioned longitudinal-edge reference line for the masking system, and it is desired never to translate the optical axis of the projection system for mere format-matching purposes. E.g., if a copying-material web of one format-breadth is replaced with one of another, the bottom edge of the second is transported along the same transport line as the first, and the optical axis of the projection system is not translated when the changeover is made.

According to one advantageous concept of the invention, the web of copying material is transported vertically, i.e., on-edge, through an exposure-station guidance system provided with the masking system which frames the section of web to be exposed. The masking system includes a stationary transverse-edge framing plate and a shiftable transverse-edge framing plate shiftable in the direction of web transport. The shiftable framing plate is upstream of the stationary framing plate. A marker mounted on the shiftable framing plate provides cutting marks on upstream ends of sections of web to be exposed. A mark detector on the stationary framing plate detects the cutting mark on the upstream end of the exposed web section after the latter has left the exposure station, interrupts transport of the exposed web section, and triggers a severing operation.

A longitudinal-edge reference line provided on the copy table (i.e., the support for the original) is automatically brought into a proper position relative to a corresponding longitudinal-edge reference line of the web guidance and masking systems, and the projection scale of the system is automically adjusted so that the breadth of the image of the original projected on the section of web to be exposed fills that section, at least nearly completely, but in no event to extend a transverse distance greater than the format-breadth of the web. The light-dark transition associated with a first transverse edge of the original is detected by light-detecting means on the stationary framing plate and used to shift the copy table (and thereby the original) to bring the first transverse edge of the original into proper position relative to the edge of the stationary framing plate. Then, the light-dark transition associated with the second transverse edge of the original is detected by light-detecting means on the shiftable framing plate and used to shift the shiftable framing plate into proper position relative to the second transverse edge of the original. After the exposure operation is performed, before the exposed web section leaves the exposure station, a marker on the shiftable framing plate provides a cutting mark at the upstream end of the exposed web section.

In the preferred embodiment, the copy table (i.e., the carrier which supports the original) is shiftable on carriages, at least in two mutually perpendicular horizontal directions. Besides the means defining the longitudinal-edge reference line, the copy table is also provided with detectors which detect the format-breadth of the original supported on the copy table. Transducers furnish signals inidcative of the format-breadth of the copying-material web, either by direct detection or after being manually set for the web format-breadth employed. The signals indicative of the format-breadths of the web and the original are applied to a computer or an addressable memory, and the latter produces required-position signals. The required-position signals are received by electronic negative-feedback control systems which control the operation of adjusting motors. The adjusting motors shift the copying table and thereby its longitudinal-edge reference line, and/or lift and lower the copying table, and/or lift and lower the projection system, until the registration of longitudinal-edge reference lines and, interrelated therewith, the projection scale needed to match the format-breadths of the original and web are established.

Preferably, the copy table is provided with a longitudinal slot extending over substantially the entire length of the copy table. An elongated infrared-light source is located below the slot. When an original to be copied is laid on the copy table, it blocks a middle portion of the slot, and infrared-light images of the light-dark transitions associated with the two transverse edges of the original are projected onto the masking system. The stationary and shiftable transverse-edge framing plates are each provided with means for detecting the respective light-dark transition. Preferably each such means comprises a pair of photodetectors. When proper registration is achieved, one photodetector receives light and the other does not. Otherwise, both photodetectors receive light or both do not, depending upon the sense of the lack of transverse-edge registration.

With the inventive method and system, even if the format of the originals varies with respect to a normal format, the image of the original projected onto the section of web to be exposed exactly fills that section of web (e.g., with the possible exception of deliberately established margins or borders). All adjustments, including changes of projection scale, are performed automatically and rather quickly. Operator participation is not required, and the theoretical unit productivity of the copying system is much more completely utilized. Because differences in format-breadth as between the copying-material web and the originals are compensated for by automatic adjustment of projection scale, it is never necessary to trim the exposed section of web merely to compensate for such differences in format-breadth. Accordingly, the cutting station through which the web is transported downstream of the exposure station need only be provided with means for transversely severing the exposed web section. Moreover, the application of a cutting mark at the shiftable upstream framing plate and the detection of that mark at the stationary downstream framing plate, makes for a very simple cutting system. No waste of copying material at all is involved. The entirety of the transported web is utilized for actual formation of copies. This is quite a distinction relative to typical prior-art systems, when those prior-art systems are made to deal with the format-matching problems discussed above.

The transport and guidance system for the copying-material web can be very simple. Because the web is transported vertically, on-edge, its inherent weight causes it to properly track a longitudinal support ledge of the guidance system, and this ledge conveniently is used to define the longitudinal-edge reference line of the masking system. The manner in which the web is transported, guided and supported on-edge, therefore need not be in any way modified after changeovers between webs of differing format-breadths. This is because changes of web format-breadth are compensated for, not by adjustment of the web transport and guidance system, but instead by automatic changes in the projection scale of the copying machine. Futhermore, the provision of the requisite cutting marks using a marker located on the shiftable upstream transverse-edge framing plate assures that a cutting mark is always provided at the upstream end of each exposed web section, despite the continual automatic adjustment of the format-lenght of the section of web to be exposed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
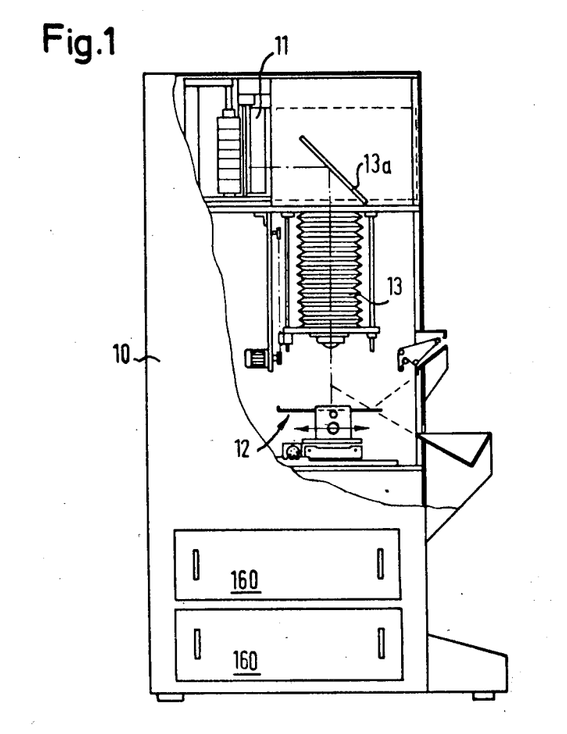
FIG. 1 is a partially cut-away overall view of a copying machine in which the inventive method and system are used.

FIG. 1 depicts a copying machine for color copying positive originals. The upper part of the machine accommodates a (non-illustrated) cassette for copying paper and a copying-paper transport system 11. An original is held flat electrostatically on a support system 12. An image of the original is projected onto the copying material, by means of a projection system 13 and a deflecting mirror 13a. The copying-paper transport system 11 is provided with masking means for masking sections of the copying paper in correspondence to the format of the original. The electronics of the machine are provided on two slide-in units 160 located at the bottom of the machine.

Figure 2:
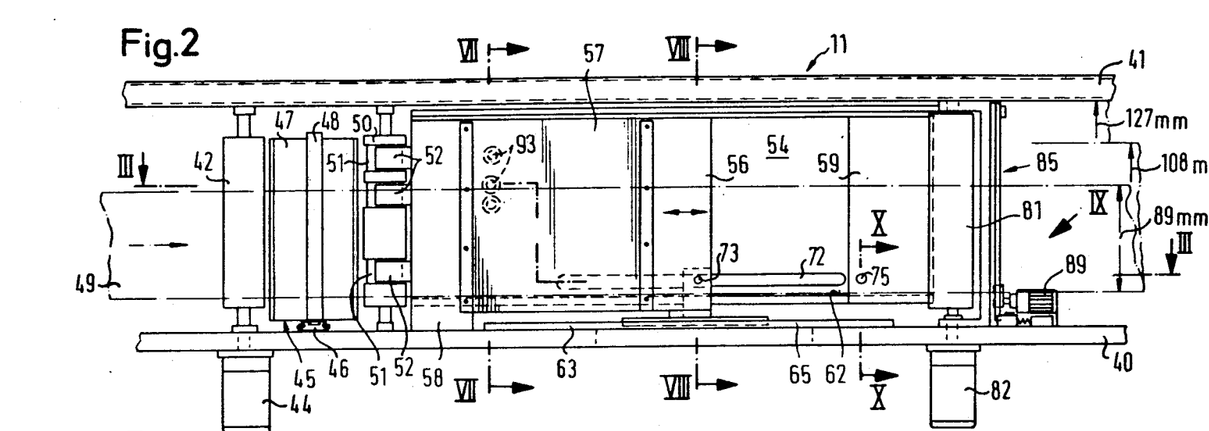
FIG. 2 is a front view, facing towards the transport, guidance and masking systems for the transported-on-edge copying material web.
Figure 3:
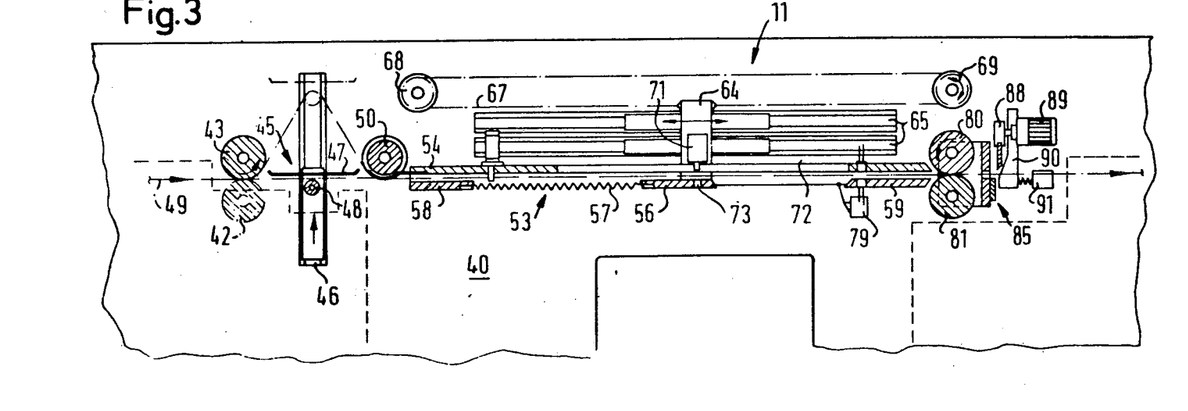
FIG. 3 is a section taken along line III—III in FIG. 2.

FIGS. 2 and 3 depict the transport system 11 for the web of copying paper. It will be understood that any suitable copying material can be used. The copying paper is pulled off a (non-illustrated) supply roll located at the left of the system (as viewed in FIGS. 2 and 3) and transported rightward to a (non-illustrated) copying-paper cassette which receives exposed web. In general, it is desired that the copying machine be able to handle webs of copying material of all commercially available breadths. However, for simplicity of explanation, only three web breadths (89 mm, 108 mm and 127 mm) are assumed. These breadths are indicated at the right in FIG. 2.

The copying-paper guidance system extends vertically between a base plate 40 and a mounting rail 41; i.e., the copying-paper transport rollers are arranged vertically, for on-edge transport of web. Proceeding from left to right, the system includes two infeed rolles 42, 43, of which the roller 43 is positively driven by a motor 44. Downstream of the infeed rollers is an accumulator 45, ball-bearing-mounted on a rail 46 and comprised of a guide plate 47 and an accumulator roller 48. A non-illustrated biasing spring urges the accumulator to the position shown in broken lines. The infeed rollers 42 and 43 are continuously driven. When all sections of the web intermediate the supply roll and take-up cassette are in transport, the web tension maintains the accumulator in its solid-line position. However, when the section of web located at the exposure station is briefly stopped, the drop in tension as web continues to be infed permits the accumulator 45 to rise. Downstream of the accumulator 45 is an infeed roller 50 provided with circumferential grooves 51 into which extend integral fingers 52 of an infeed plate. This infeed plate is secured to the guide plate 54 of a masking system 53.

The masking system 53 includes the guide plate 54 just mentioned, which is fixedly secured to the base plate 40. At its upstream side, the masking system 53 includes a framing plate 56. Framing plate 56 is shiftable in the direction of copying-paper transport. Framing plate 56 is connected, through the intermediary of an accordion structure 57, to a stationary blocking plate 58. At its downstream side, the masking system includes a stationary framing plate 59. The web of copying paper is transported through the gap intermediate guide plate 54 and stationary blocking plate 58, through the gap intermediate guide plate 54 and accordion structure 57, above the downstream remainder of accordion structure 57 and above the shiftable framing plate 56, through the exposure zone per se, and through the gap internal to the downstream stationary framing plate 59. The copying paper is transported upright (i.e., on edge) and its bottom edge is supported on a guidance ledge 62, which also defines a reference line for the bottom edge. This can be seen, particularly clearly, in FIG. 8.

Figure 8:
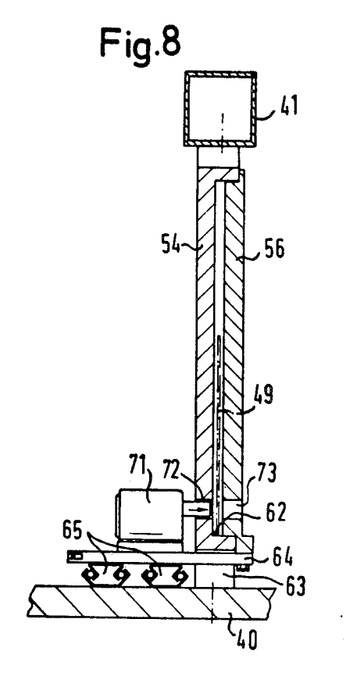
FIG. 8 is a section taken along line VIII—VIII of FIG. 2.

As shown in FIG. 3, the shiftable framing plate 56 is shifted by means of a shifter 64. Shifter 64 is ball-bearing-mounted on guide rails 65. As shown in FIG. 8, it is, in particular, the lower edge of the shiftable framing plate 56 which is secured to the shifter 64. The lower edge of the guide plate 54 is directly supported on the base plate 40, but provided with a longitudinally extending slot 63 (see FIG. 2 as well as FIG. 8) through which the shifter 64 extends to the point where it is secured to the lower edge of shiftable framing plate 56. Secured to the back end of the shifter 64 is a drive rope 67, trained about pulleys 68 and 69, of which pulley 69 is motor-driven. Motor-driven pulley 69 moves the shifter 64 and thereby shifts the framing plate 56 leftward or rightward. Mounted on the shifter 65 behind the guide plate 54 (see FIG. 8) is an electromagnetic puncher 71, whose punch extends into a longitudinal slot 72 in the guide plate 54. When puncher 71 is energized, its punch moves in the direction of the arrow (FIG. 8) into bore 73 in the shiftable framing plate 56, thereby forming a perforation in the web 49. The puncher 71 and the bore 73 can also be seen in FIG. 3, and the bore 73 also in FIG. 2. This perforation is utilized as a cutting mark.

Figure 10:
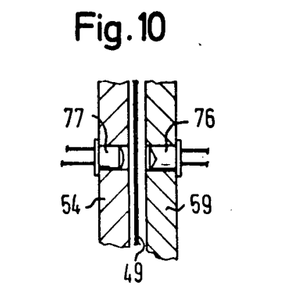
FIG. 10 is a section taken along line X—X of FIG. 2.

As shown in FIG. 2, the stationary framing plate 59 is provided with a bore 75, located at the same height as the longitudinal slot 72 and the bore 73. Associated with this bore 75 is a sensing system for the cutting mark, schematically indicated in FIGS. 3 and 10.

This sensing system includes a phototransistor or photodiode 76 (see FIG. 10) acommodated within the bore 75 in the stationary framing plate 59. A light source 77 is located directly opposite, in a bore in the stationary guide plate 54. During web transport, the phototransistor generates a signal, when the aforementioned perforation (cutting mark) passes by and unblocks the light path between the phototransistor 76 and light source 77. This signal is utilized to immediately stop the section of the web located at the exposure station.

A limit switch 79 (see FIG. 3) is provided in the vicinity of the upstream edge of stationary framing plate 59. If shiftable framing plate 56 is shifted rightward so far as to approach stationary framing plate 59, limit switch 79 becomes activated before the shiftable plate 56 touches the stationary plate 59, and stops motor 69.

At the downstream end of the stationary framing plate 59 are two outfeed rollers 80, 81 which pull the infed web through the masking system. Roller 81 is positively driven by a motor 82, and it is motor 82 which is briefly stopped by phototransistor 76, when the latter generates a stop signal in response to a perforation (cutting mark). Thus, the web 49 is transported through the masking system intermittently, each time by a distance equal to the length of copying paper just exposed. Then, the next section of copying paper is exposed, a perforation is provided at its upstream end, and the motor 82 is again energized, to effected renewed paper transport, until the perforation just formed reaches the sensing system 76, 77, whereupon the motor 82 is again stopped, and so forth.

Figure 9:
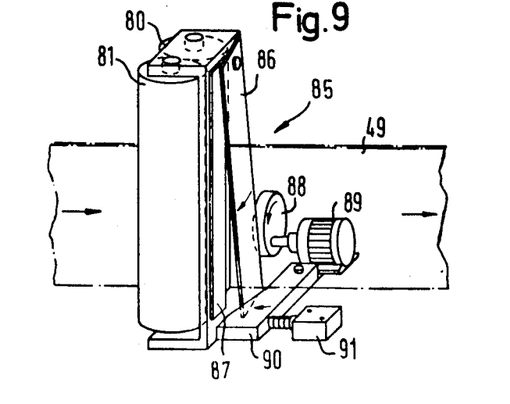
FIG. 9 is a perspective view of the cutting station.

As shown in FIG. 3, there is provided downstream of the outfeed rollers 80,81 a cutting station 85, shown in perspective in FIG. 9. A blade 86 is swingably mounted at the upper end of the mounting bracket for the outfeed rollers 80, 81 and cooperates with a stationary blade 87 to sever web 49 located therebetween along a transverse cut line. Swingable blade 86 is engaged by an eccentric 88, driven by a motor 89. When eccentric 88 rotates, it drives swingable blade 86 towards the web 49. As blade 86 swings it slides along the inclined upstream face of a lever 90, the latter being mounted for swinging movement about a vertical axis. The lever 90 activates a limit switch 91 as the blade 86 begins to swing, briefly shutting off the transport motor 82, so that web transport will briefly cease during the severing operation.

Figure 7:
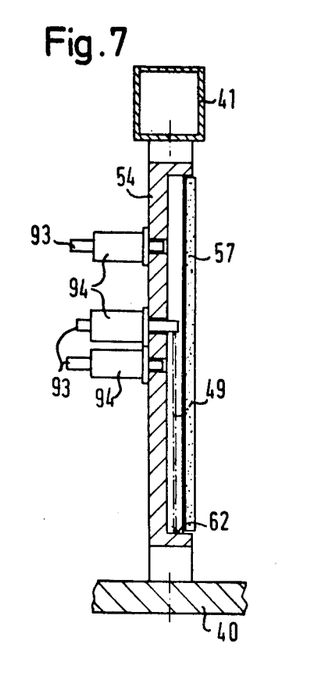
FIG. 7 is a section taken along line VII—VII of FIG. 2.

As shown in FIG. 2, but most clearly in FIG. 7, there is provided on the back side of guide plate 54 a set of three electromagnetically activatable guide pegs 93, corresponding to the three paper breadths (89 mm, 108 mm, 127 mm) mentioned before. When the electromagnet 94 associated with one of these pegs 93 is energized, the peg 93 extends through a bore in guide plate 54 into the transport gap for the transported web 49, at a height exactly corresponding to the upper edge of the transported web 49. The on-edge web 49, due to its own weight, bears upon the reference ledge 62, but the introduction of one of the guide pegs 93 serves as a back-up expedient, to assure that during transport and exposure operations the web cannot lift up at all.

Figure 4:
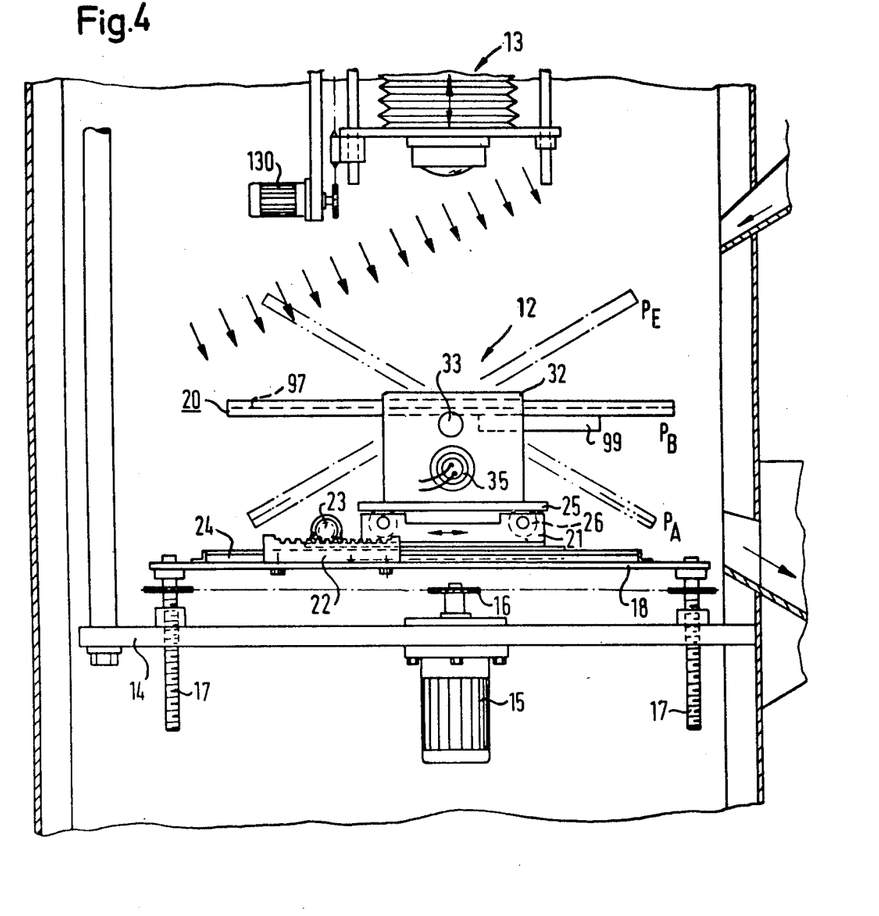
FIG. 4 depicts the mounting of the copy table on x- and y- carriages and on z- displacement screw spindles.

As shown in FIG. 4, a copy easel 20 (hereafter referred to as the original carrier) for the original to be copied is supported on a carriage 25 mounted for lateral shiftability (i.e., in the direction of web transport, but normal to the drawing plane as viewed in FIG. 4). Carriage 25, in turn, is mounted on a carriage 21 for forward-backward shiftability (i.e., in the direction perpendicular to web transport, but right and left as viewed in FIG. 4). A base plate 14 supported by the framework of the copying machine mounts a motor 15, operative for upwardly and downwardly displacing the original carrier 20. The lifting and lowering of the original carrier 20 is effected by lifting screws 17. Each lifting screw 17 is provided with a sprocket wheel non-rotatable relative thereto. A drive chain 18 is entrained about the sprocket wheels and driven by motor 15, through the intermediary of a sprocket drive gear 16. Mounted on the upper ends of the lifting screws 17 is a carrier plate 18. Carrier plate 18 mounts the carriages 21 and 25 as well as the drive motors for these carriages.

The lower carriage 21 (for forward-backward shifting, i.e., transverse to the web transport direction) is ball-bearing-mounted on guide rails 24 on the carrier plate 18. The drive motor 23 for carriage 21 is mounted on the carriage 21 itself. The output gear of drive motor 23 cooperates with a rack 22 fixedly mounted on the carrier plate 18.

The left-right carriage 25 (which effects shifting of the original carrier 20 in the transport direction web 49) has secured to its bottom (see FIG. 5) mounting sleeves 26 which slide along guide rails 27. One guide sleeve 26 is secured to a drive rope 29 trained about pulleys 30, of which one is driven by a motor 28.

The carriage 25 mounts the original carrier 20. Located at the two lateral edges of the base plate of carriage 25 are two upright side plates 32. Turnably mounted in these side plates 32 is a shaft 33. The shaft 33 is turned in one direction or the other by a motor 34, mounted on one of the side plates 32. The original carrier 20 is mounted on the shaft 33.

Figure 5:
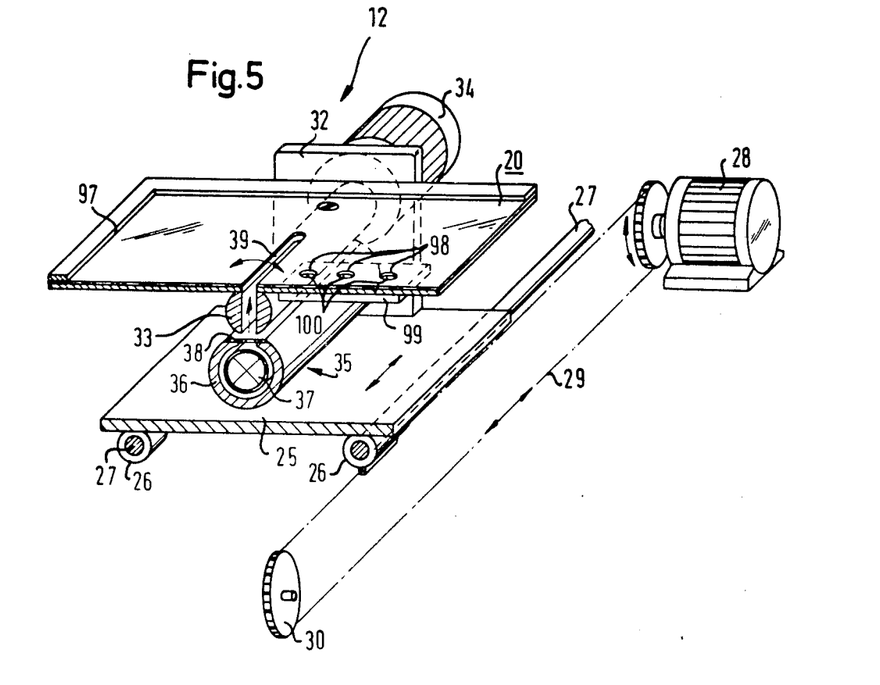
FIG. 5 is a perspective view of a part of the copy table and one of its supporting carriages.

The original carrier 20 can be welded to the shaft 33 or, as shown in FIG. 5, screwed to the shaft. Motor 34 is used to turn shaft 33 in one direction or the other, and thereby tilt the original carrier to its infeed position $P_E$, its exposure position $P_B$ or its outfeed position $P_A$ (see FIG. 2).

When original carrier 20 is in its infeed position $P_E$ it can receive an original from an infeed unit; when it is in its outfeed position $P_A$ it can discharge an original to an outfeed unit.

Arranged beneath the shaft 33 is an infrared-light source 35, mounted on the upright side plates 32. The infrared-light source 35 comprises a slotted pipe 36 in which is accommodated a tubular lamp 37. The slot in pipe 36 is covered by a filter plate 38 which is transmissive for infrared light only. The infrared radiation transmitted through filter plate 38 (and indicated by the upward arrow in FIG. 5) passes through a slot 39 provided in both the shaft 33 and the original carrier 20; this slot 39 extends over almost the entire length of shaft 33 and of the original carrier 20.

When an original is fed onto the carrier 20, its edge abuts against an edge stop 97 on the carrier. The carrier 20 is provided with bores 98, behind which are arranged photosensors 99, conveniently located in a housing 100 mounted on the bottom side of original carrier 20. The purpose served by photosensors 99 is explained further below.

When an image of the original is to be formed on the web 49, it is necessary that the masking system 53 be adjusted (the distance between shiftable framing plate 56 and stationary framing plate 59 be adjusted) to correspond exactly to the length of the image projected onto the web 49 (as measured in the web transport direction). How this is accomplished is explained with reference to FIG. 6.

Figure 6:
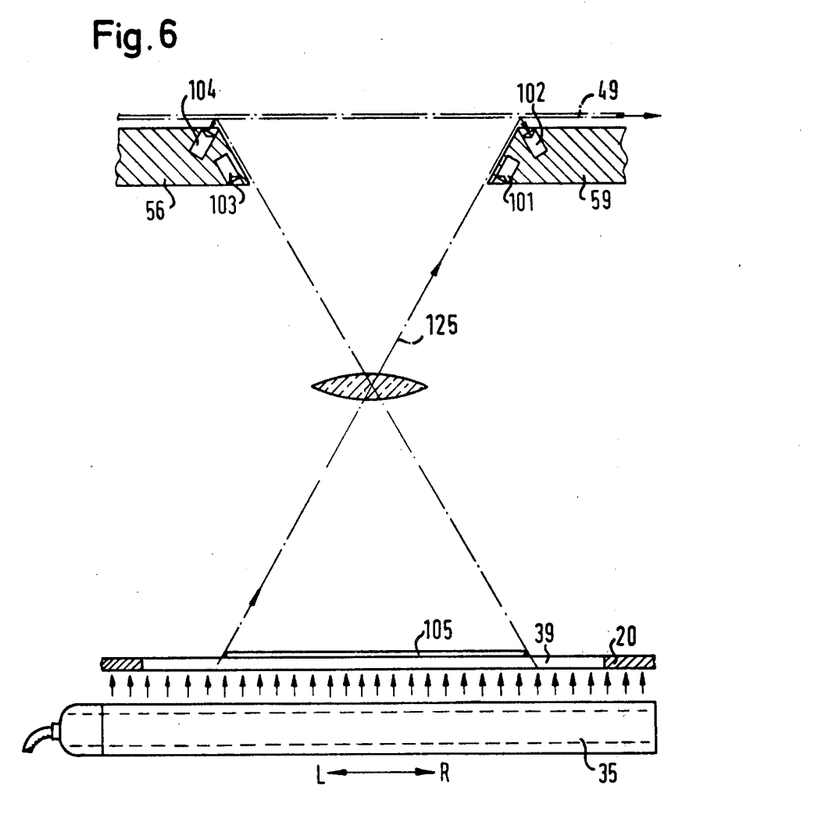
FIG. 6 schematically depicts how the format-length of the masking system is adjusted by detection of infrared-light images on light-dark transitions associated with the two transverse edges of the original to be copied.

As shown in FIG. 6, the downstream end of the shiftable framing plate 56 and the upstream end of the stationary framing plate 59 are both inclined. Phototransistors 101–104 are mounted on the plates 56, 59 and are operative for detecting the light-dark discontinuities formed at the edges of the original 105. The phototransistors 101 and 103 are oriented to receive direct light from the infrared light source 35. In contrast, phototransistors 102 and 104 are oriented to receive the light from light source 35 reflected from the surface of the copying-paper web 49. The paths of rays 125 through the schematically depicted projection system is itself illustrated very schematically, but suffices for the explanation of how the masking system 53 is adjusted.

The infrared light from source 35 passes through the slot 39 in the shaft 33 and carrier 20 and is transmitted by the projection system onto the masking system 53. In particular, because the original 105 itself blocks the infrared light, what is projected onto the masking system are images of the light-dark transitions at the edges of the original 105. The response of phototransistors 101–104 to these light-dark transitions is utilized for the automatic adjustment of the masking system (the distance between shiftable framing plate 56 and stationary framing plate 59). The adjusting circuit in which phototransistors 101–104 are connected is depicted in FIG. 11.

Figure 11:
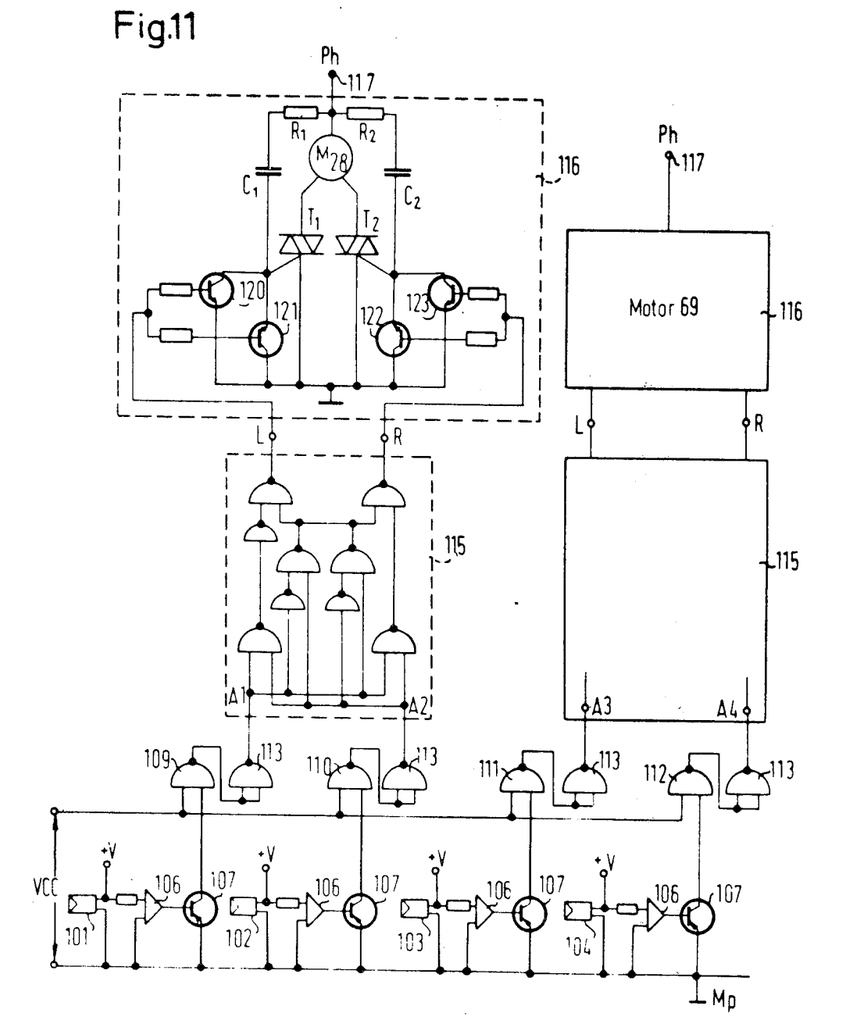
FIG. 11 depicts a control circuit for the automatic matching of the format-length of the masking system to the format-length of the original to be copied.

As shown in FIG. 11, each phototransistor 101–104 determines one input signal applied to an associated one of four NAND-gates 109–112, through the intermediary of respective operational amplifiers 106 and transistors 107. The other input of each NAND-gate is connected to a source of reference voltage $V_{CC}$. The outputs of NAND-gates 109 and 110 are connected, through the intermediary of gates 113, to respective inputs A1 and A2 of an evaluating circuit 115. Likewise, the outputs of NAND-gates 111 and 112 are connected, through the intermediary of gates 113, to respective inputs A3 and A4 of a second such evaluating circuit 115. The first evaluating circuit 115 has two outputs L, R, connected to inputs of a motor-control circuit for the motor 28 of carriage 25. The second evaluating circuit 115 has two outputs L, R, connected to the inputs of a motor-control circuit for the motor 69 which drives the shiftable framing plate 56.

Phototransistors 101 and 102 sense the light-dark transition at the left edge of the original 105 (as viewed in FIG. 6). If the left edge of the original 105 is correctly positioned, so that during an exposure operation the image of this left edge will coincide with the edge of the stationary framing plate 59, the light-dark transition projected onto phototransistors 101 and 102 will be such that one phototransistor receives light and the other does not. In that event, a "1" signal and a "0" signal will be applied to the two inputs of evaluating circuit 115, and the motor 28 for carriage 25 will not be energized. However, if the left edge of original 105 (as viewed in FIG. 6) is not correctly positioned, both phototransistors 101, 102 will be in receipt of light, or else not in receipt or light, depending upon the sense of the positioning error. In that event, both inputs A1, A2 will receive "0" signals, or else "1" signals, as the case may be.

The logic implemented by the first evaluating circuit 115 is such that, if both inputs thereof receive "1" signals, or if both inputs receive "0" signals, the motor 28 for carriage 25 will be energized, to shift the carriage 25 in whichever direction is required to properly position the left edge of the original 105 (as viewed in FIG. 6).

Considering next the phototransistors 103 and 104, these sense the light-dark transition at the right edge of original 105 (as viewed in FIG. 6). If the downstream end of the framing pate 56 is correctly positioned, so that during an exposure operation the image of the right edge of the original (as viewed in FIG. 6) coincides with the edge of the framing plate 56, the light-dark transition projected onto phototransistors 103 and 104 will be such that one phototransistor receives light and the other does not. The motor 69 which shifts the framing plate 56 will not be energized. However, if the edge of the framing plate 56 is not correctly positioned, both phototransistors 103, 104 will be in receipt of light, or else not in receipt of light, depending upon the sense of the positioning error. In that event, both inputs A3, A4 receive "0" signals, or else "1" signals, as the case may be. In response, the motor 69 is energized in one direction or the other, to shift the framing plate 56 in the requisite direction.

The evaluating circuit 115, which are identical, are here comprised of NAND-gates and inverters.

The motor-control circuits 116, which are identical, receive A.C. voltage at terminal 117. This A.C. voltage is applied via a resistor R1 and a capacitor C1 to the gate of a triac T1 which is connected in the motor-winding current path between terminal 117 and ground. In this way, triac T1 is fired during successive half-cycle of the A.C. voltage, and the motor 28 is operated in the corresponding direction.

To operate the motor 28 in the opposite direction, triac 2 is fired via resistor R2 and capacitor C2. When the motor 28 is to be energized in one direction, evaluating circuit 115 applies a "0" signal to one input of motor-control circuit 116 and a "0" signal to the other input thereof, and vice versa when the motor 28 is to be energized in the opposite direction. Depending upon which input receives a "1" signal and which a "0" signal, different ones of the transistors 120–123 are rendered conductive and non-conductive, to prevent firing of the triacs in a manner preventing motor energization in one or the other direction. The correlation of the light and dark states of phototransistors 101, 102 and 103, 104, the signals at inputs A1, A2 and A3, A4, and the signals at outputs L and R, is tabulated as follows:

| PHOTOTRANSISTOR 101 (103) | 102 (104) | A1 (A3) | A2 (A4) | L | R |
|---|---|---|---|---|---|
| dark | dark | 1 | 1 | 0 | 1 |
| light | light | 0 | 0 | 1 | 0 |
| light | dark | 0 | 1 | 1 | 1 |
| dark | light | 1 | 0 | 1 | 1 |

Figure 12:
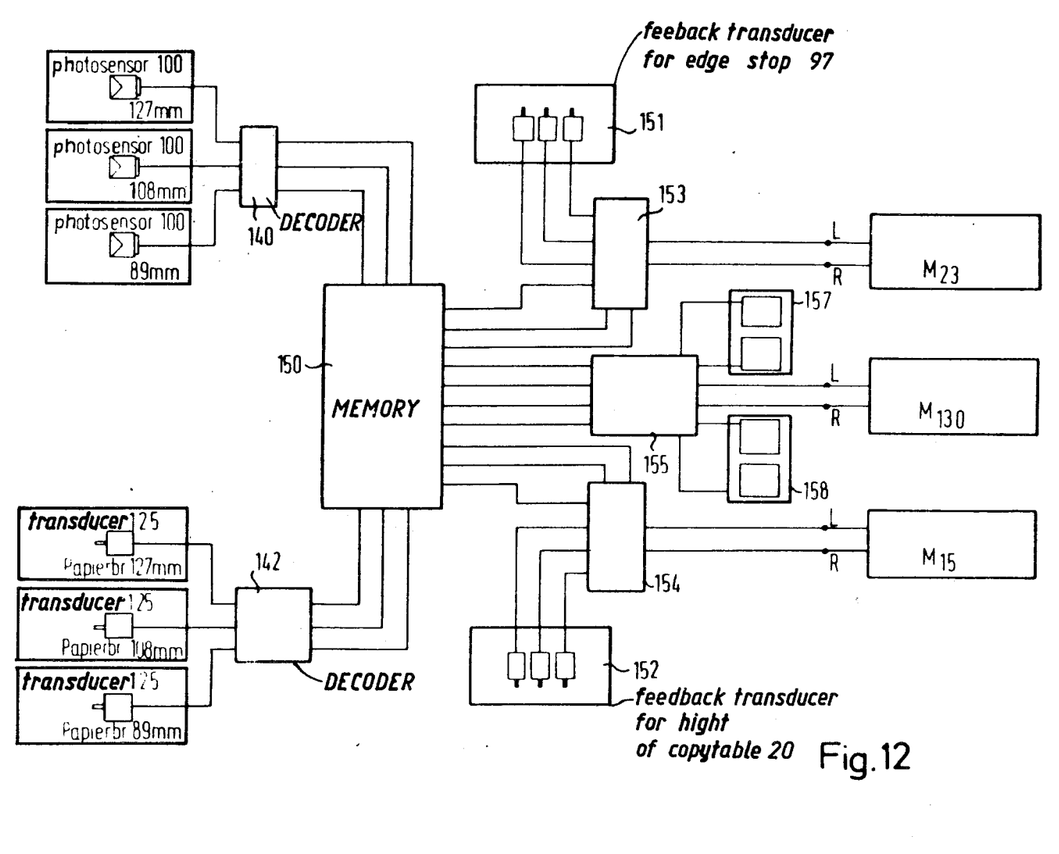
FIG. 12 depicts a control circuit for the automatic matching of the format-breath of the original to the format-breadth of the web of copying material.

FIG. 12 depicts the electronic control system which controls the operation of motor 23 (which shifts carriage 21 forward and backward), motor 130 (which raises and lowers the projection system 13 as shown in FIG. 4), and motor 15 (which lifts and lowers the carrier plate 18 and thereby lifts and lowers the carrier 20 for the original to be copied). The circuit of FIG. 11 automatically sets the distance between the shiftable framing plate 56 and the stationary framing plate 59 to a value such that the left and right edges of the original 105 (as viewed in FIG. 6) will, during an exposure operation, be imaged onto the edges of the framing plates 56 and 59. In contrast, the circuit of FIG. 12 assures that the top and bottom edges of the original 105 are imaged onto the longitudinal edges of the copying paper 49 (either exactly, or at a predetermined small spacing from such edges, if that is desired). In particular, if the breadth of the original is not equal to the breadth of the copying paper, this requires that the projection system 13 be raised or lowered by motor 130 and that the carrier 20 be raised or lowered by motor 15, until the scale of reduction or enlargement established is such that the breadth of the image of the original projected onto the copying paper corresponds to the breadth of the copying paper. Also, even if the breadth of the projected image is made to correspond to the copying-paper breadth, it is furthermore necessary that the carriage 21 be shifted forward or backward to a position such that the image of that edge of the original which abuts against edge stop 97 (FIG. 6) coincides with the longitudinal edge of copying paper 49 bearing upon guidance ledge 62 (FIGS. 7 and 8), i.e., so that actual transverse register will be achieved.

In general, for any given combination of breadths of the original and of the copying paper, it is necessary that the edge stop 97 (FIG. 6) be moved to a certain position, that the carrier 20 be moved to a certain elevation, and that the projection system 13 be moved to a certain elevation.

In the control system depicted in FIG. 12, it is assumed for the sake of explanation that the copying paper 49 can have one of only three different breadths (89 mm, 108 mm, 127 mm); likewise, it is assumed that the original 105 can have one of only three different breadths (89 mm, 108 mm, 127 mm), e.g., because there are the breadths of the commercially available photographic materials which the machine is to be capable of handling. Thus, there are, in all, nine different possible combinations of copying-paper breadth and original breadth. For each of these nine possible situations, a certain elevation for the optical system 13, a certain height for the carrier 20 and a certain forward-backward shifted position for the edge stop are required. Thus, for each of these nine possible situations, three required-positions are to be established. These nine sets of three required-positions each are determined in advance and stored in a memory 150. I.e., the memory 150 has nine storage sectors, each of which comprises three sub-sectors, each of which stores the information concerning one of the required-positions in the set of three required-positions associated with that storage sector.

Preferably, the required-position information is stored in digitally encoded form.

A first decoder 140 receives the signals from the three phototransistors 100 shown in FIG. 5, and produces an output signal indicative of the detected breadth of the original (89 mm, 108 mm or 127 mm).

A second decoder 142 receives signals from three copying-paper-breadth transducers 125. These transducers 125 can be manually activated switches; the breadth of the copying paper 49 usually will not be changed with any great frequency, and the operator of the machine, when he changes copying paper, will not be inconvenienced by having to manually activate, for example, a pushbutton switch. In general, however, the transducers 125 could likewise be photosensors operative for automatically ascertaining the breadth of the copying paper without operator intervention, i.e., in the same way the photosensors 100 ascertain the breadth of the original 105. In either event, encoder 142 produces an output signal indicative of the breadth of the copying paper being utilized (89 mm, 108 mm, or 127 mm).

The two output signals produced by decoders 140 and 142 together constitute an address signal, which addresses one of the aforementioned nine storage sectors in memory 150. In response to this address signal, there appear on the three sets of outputs of memory 150 three signals, indicative of the three required-positions for the combination of paper breadth and original breadth ascertained.

The first required-position signal, appearing on the upper outputs of memory 150, identifies the forwards-backwards shifted position required for the edge stop 97 (FIG. 6), and this signal is applied to a first comparator 153. Comparator 153 also receives an actual-position signal identifying the actual position of the edge stop 97. This actual-position signal is furnished to comparator 153 by a position detector 151. Position detector 151 may, for example, comprise a set of position-detecting switches. Persons skilled in the art will appreciate that a great variety of position detectors can be utilized to generate the actual-position signal concerning edge stop 97. If the actual-position and required-position signals applied to comparator 153 exhibit a discrepancy, comparator 153 applies a control signal to the left or right (L or R) input of the motor-control circuit for motor 23, depending upon the sense of the discrepancy. By negative-feedback action, the edge stop 97 is brought to the required position.

Likewise, the second required-position signal, appearing on the bottom outputs of memory 150, identifies the required elevation for original carrier 20, and this signal is applied to a comparator 154. A feedback transducer system 152 (here shown schematically as a set of position-detecting switches) applies to the comparator 154 an actual-position signal, indicating the actual elevation of the carrier 20. Again, by negative-feedback action, the motor 15 is energized in one direction or the other, to raise or lower the carrier 20 to the required elevation.

Finally, the third required-position signal, appearing on the middle outputs of memory 150, identifies the required elevation for the optical system 13 (FIG. 6), and this signal is applied to a comparator 155. A feedback transducer system (here shown schematically as position-detector switches 157 and 158) applies to the comparator 155 an actual-position signal, indicating the actual elevation of optical system 13. Again, by negative-feedback action, the motor 130 is energized in one direction or the other, to raise or lower the optical system 13 to the required elevation.

As indicated above, for purposes of explanation, it is assumed that only nine possible combinations of copying-paper breadth and original breadth will be encountered, thus requiring only nine storage sectors within memory 150. If a greater number of possible combinations of copying-paper breadth and original breadth are to be within the capacity of the machine, then a correspondingly greater number of storage sectors will be provided in memory 150.

Likewise, it is preferred that unit 150 be a simple addressable memory, and not a computer which actually calculates the three required-position signals for each situation encountered. However, the use of a computer to furnish the required-position signals would fall within the spirit and scope of the present invention. The use of a computer which calculates the required-position signals could be appropriate when the breadth of the copying paper and/or the breadth of the originals to be copied is not limited to a finite set of possible values. However, even in the latter event, an addressable memory could still be used and would ordinarily be preferable.

It will be appreciated that the operations performed by the control circuit of FIG. 12 are to be performed in advance of those performed by the circuit of FIG. 11. The control circuit of FIG. 12 may detect the need for a change of scale, and if a change of scale is required, it must of course be affected before the operations performed by the circuit of FIG. 11.

It will be understood that each of the elements described above, or two or more together, may also find a useful application in other types of circuits and constructions differing from the types described above.

While the invention has been illustrated and described as embodied in a particular type of copying machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of forming in a copying machine a copy whose format-length and format-breadth is matched to the format-length and format-breadth of the original being copied comprising, in combination, the steps of transporting a web of copying material on-edge through an exposure-station web guidance system provided with a masking system including a stationary transverse-edge framing plate and a shiftable transverse-edge framing plate shiftable in the direction of web transport, laying an original to be copied on an original carrier located in front of the projection system of the machine and projecting an infrared-light image of the original onto the web of copying material; matching the format-breadth of an infrared-light image of the original projected on the web to the format-breadth of the web, by bringing the projected image of a first longitudinal-edge reference line on the original carrier into register with a corresponding first longitudinal-edge reference line of the masking system, and adjusting the projection scale to cause the format-breadth of the projected image to assume a value at least nearly equal to but not in excess of the format-breadth of the web; then bringing the projected image of a first transverse edge of the original into register with the edge of the stationary framing plate, by using light-detector means provided on the stationary framing plate to generate a signal dependent upon the relative positions of the edge of the stationary framing plate and the light-dark transition associated with the first transverse edge of the original and applying this signal as a control signal to a motor operative for laterally shifting the original carrier until registration is achieved; then bringing the edge of the shiftable framing plate into register with the projected image of the second transverse edge of the original, by using light-detector means provided on the shiftable framing plate to generate a signal dependent upon the relative positions of the edge of the shiftable framing plate and the light-dark transition associated with the second transverse edge of the original and applying this signal as a control signal to a motor operative for shifting the shiftable framing plate until registration is achieved; then performing an exposure using exposure light to which the copying material is sensitive; and before transporting the framed and exposed section of the web out of the exposure station providing a cutting mark on the web using marking means mounted to share the shifting movement of the shiftable framing plate.

2. In a copying machine, in combination, means for transporting a web of copying material on-edge along a predetermined path, including web-guidance means operative for guiding the web along the transport path, the web-guidance means being provided with masking means including a stationary transverse-edge framing plate, and a shiftable transverse-wedge framing plate mounted shiftable in the direction of web transport; means for supporting an original to be copied including an original carrier mounted for longitudinal and transverse shifting movement, the original carrier being provided with means defining a first longitudinal-edge reference line, and the masking means being provided with means defining a corresponding first longitudinal-edge reference line; projecting means located intermediate the original carrier and the web and operative for projecting an image of the original onto the web; a source of infrared light mounted on the original carrier beneath the plane occupied by an original supported on the original carrier, the source of infrared light extending along substantially the entire length of the original carrier, and being operative for causing the projecting means to project towards the masking means infrared-light images of the light-dark transitions associated with the first and second transverse edges of an original supported on the original carrier; means for automatically matching the format-breadth of the image of the original projected on the web to the format-breadth of the web, including means automatically operative for bringing the projected image of the first longitudinal-edge reference line on the original carrier into register with the corresponding first longitudinal-edge reference line of the masking means, and means for automatically adjusting the projection scale of the image projected by the projecting means to cause the format-breadth of the projected image to assume a value at least nearly equal to but not in excess of the format-breadth of the web; first light-detecting means mounted on the stationary framing plane operative in response to the projected infrared-light image of the light-dark transition associated with the first transverse edge of the original for generating a first signal indicative of the relative positions of the edge of the stationary framing plate and the first transverse edge of the original; second light-detecting means mounted on the shiftable framing plate operative in response to the projected infrared-light image of the light-dark transition associated with the second transverse edge of the original for generating a second signal indicative of the relative positions of the edge of the shiftable framing plate and the second transverse edge of the original; means receiving the first signal and operative in dependence thereon for automatically shifting the original carrier until the projected infrared-light image of the light-dark transition associated with the first transverse edge of the original is in register with the edge of the stationary framing plate; means receiving the second signal and operative in dependence thereon for automatically shifting the shiftable framing plate until the projected infrared-light image of the light-dark transition associated with the second transverse edge of the original is in register with the edge of the shiftable framing plate; means operative for performing an exposure of the framed section of web using exposure light to which the web is sensitive; cutting means located downstream of the exposure location for severing exposed sections of web; marking means mounted on the shiftable framing plate and operative for providing a cutting mark on the web prior to transport of the exposed section of web out of the exposure location; and mark-detecting means mounted on the stationary framing plate and operative for sensing the cutting mark and in response thereto activating the cutting means.

3. In a copying machine as defined in claim 2, further including a set of photosensors mounted on the original carrier at locations corresponding to different possible format-breadths of the original, a set of transducers operable for generating signals indicative of the different possible format-breadths of the web of copying material, means receiving signals from the photosensors and from the transducers and operative in dependence thereon for furnishing for each different combination of format-breadths of the original and the web a different respective set of required-position signals, including a first required-position signal indicating a required position for the first longitudinal-reference line on the original carrier, a second required-position signal indicating a required position for the projection system in the direction towards and away from the original carrier, and a third required-position signal indicating a required position for the original carrier in the direction towards and away from the projection system, the means for automatically matching the format-breadth of the image of the original projected on the web to the format-breadth of the web including first negative-feedback means operative for receiving the first required-position signal and shifting the original carrier by negative-feedback action until the position indicated by the first required-position signal is reached, second negative-feedback means operative for receiving the second required-position signal and moving the projection system by negative-feedback action until the position indicated by the second required-position signal is reached, and third negative-feedback means operative for receiving the third required-position signal and moving the original carrier by negative-feedback action until the position indicated by the third required-position signal is reached.

4. In a copying machine as defined in claim 2, the first and second light-detecting means each comprising at least one pair of light sensors mounted at the edge of the respective framing plate, the two light sensors of each pair being so positioned and oriented that one receives light and the other does not or both receive light or neither receives light, depending upon whether the edge of the respective framing plane and the infrared-light image of the respective transverse edge of the original are in register, out of register in a first direction or out of register in the opposite direction.

5. In a copying machine as defined in claim 2, the means for supporting an original to be copied including means mounting the original carrier for swinging movement to a first angular position for receipt of an original to be copied, a second angular position for copying and a third angular position for outfeed of an original, the infrared-light source being an elongated light source extending parallel to the turning axis of the original carrier and located at the side of the original carrier opposite to that upon which originals to be copied are supported, the original carrier being provided with an elongated slot extending along substantially the entire length of the original carrier, for transmission of infrared light to the projecting means through those portions of the slot not covered by an original supported on the original carrier.

6. In a copying machine as defined in claim 2, the shiftable framing plate being located upstream of the stationary framing plate, the marking means comprising an electromagnetically activated perforator mounted to share the shifting movement of the shiftable framing plate.

7. In a copying machine as defined in claim 6, the mark-detecting means comprising a perforation sensor mounted on the stationary framing plate.

8. In a copying machine as defined in claim 2, the cutting means including a swingably mounted cutting blade, and means for swinging the cutting blade including a rotatably mounted eccentric bearing upon the cutting blade and operative during rotation for swinging the cutting blade towards the web of copying material.

9. In a copying machine as defined in claim 2, the means for supporting an original to be copied including a carriage mounting the original carrier for movement in direction parallel to the transverse edges of the original, a carriage mounting the original carrier for movement in direction parallel to the longitudinal edges of the original, a carrier plate mounting the carriages and the original carrier, and a set of screw spindles coupled to the carrier plate and operative when rotated in one or the opposite direction for moving the original carrier towards or away from the projecting means.

10. In a copying machine as defined in claim 2, the means defining the first longitudinal-edge reference line of the masking means comprising a longitudinally extending support ledge upon which the lower edge of the web is supported during on-edge transport of the web.

* * * * *